United States Patent Office 3,407,150
Patented Oct. 22, 1968

3,407,150
OXYALKYLATED PHOSPHORUS ACID ESTERS AS URETHANE FIRE-RETARDANTS
Marco Wismer, Gibsonia, Richland Township, Allegheny County, Herman P. Doerge, Verona, Paul R. Mosso, Natrona Heights, Harrison Township, Allegheny County, and James F. Foote, Sarver, Pa., assignors to Pittsburgh Plate Glass Company, Pittsburgh, Pa., a corporation of Pennsylvania
No Drawing. Continuation-in-part of application Ser. No. 256,845, Feb. 7, 1963. This application Jan. 12, 1966, Ser. No. 520,049
5 Claims. (Cl. 260—2.5)

This application is a continuation-in-part of copending application Ser. No. 256,845, filed Feb. 7, 1963, now abandoned.

This invention relates to flame resistant polyurethane resin foams such as have been used as thermal insulation and for other purposes, and it has particular relation to the provision of inexpensive flame retardant polyurethane resin foams which are relatively stable against chemical degradation and also retain their dimensional stability even under conditions of high humidity in aging, the foams of this invention further being characterized by amenability to "one shot" or single stage production methods.

It has heretofore been recognized that polyurethane resin foams such as are obtained by reacting under foaming conditions, a liquid mixture of a compound containing a plurality of hydroxyl groups per molecule and a compound containing two or more isocyanato groups per molecule, while having many desirable properties and, notably, a high degree of resistance to the transmission of heat, are objectionably inflammable. If ignited, they will often support combustion even until they are completely consumed. In some instances, chars formed in the combustion of the foams will continue to glow as a coal for some time even after the material has ceased to flame. This is particularly true in those instances wherein the polyol component is a polyether polyol resulting from reaction of a carbohydrate, such as sucrose, with an alkylene oxide.

It has been suggested to reduce the flammability of polyurethane resin foams by incorporation thereinto of certain phosphorus-containing organic compounds or by addition of other fire retarding agencies. While it was thus possible to reduce the flammability of the foamed polyurethane resin, the resultant products were still objectionable for various reasons. For example, the ingredients thereof often tended to be of poor compatibility with other components involved in the formation of the polyurethane foamed resins. Therefore, the systems did not lend themselves to single shot or one stage production, but it was usually necessary or desirable to react preliminarily the isocyanato component with the polyol component to provide a quasi-prepolymer which in a subsequent stage was formulated with other ingredients to provide a foamable and curable mixture, thus complicating the process. Another serious defect often encountered where the resins were used for purposes wherein they were subjected to moisture, resided in poor stability of the foams. When exposed to moist or humid conditions, the foams, within a relatively short time, would often tend to swell to an objectionable degree and furthermore, even if they were allowed to dry out, their capacity for flame resistance was seriously impaired and they would otherwise tend to assume a degraded state.

Many of the polyurethane resin foams which it is desirable to treat to reduce flammability are such as those resulting from the reaction of a polyol and a diisocyanate containing a pair of isocyanato groups attached to a hydrocarbon body, or more notably, a prepolymer containing a plurality (often many) of isocyanato groups together with one or more urethane linkages, said prepolymer being prepared of the polyol and the diisocyanate. It has been disclosed in U.S. Patent 3,134,742 to reduce the flammability of this type of foam by incorporating combinations of phosphorus compounds, one of which was a phosphoryl polyamide and another of which was a phosphorus polyol. As heretofore used, neither of these components taken singly was very effective in reducing the flammability of polyurethane resins, but the two together produced a synergistic effect whereby to attain good fire retardancy.

The use of this synergistic combination of phosphorus-containing polyol and phosphoryl polyamide constituted a very marked advance in the art of producing useful flame retardant polyurethane resin foams. However, in certain respects, the combination has been found to be open for improvement. For example, the foams were relatively expensive and an important item of expense in their production resided in the requirement for the use of the phosphoryl polyamide, which was relatively expensive to produce. Moreover, the phosphoryl polyamide component was usually obtained in the form of a powder, which was relatively difficult to incorporate into the foamable mixture. It was also usually necessary to react the isocyanato component with a portion of the polyol to provide the aforementioned liquid quasi-prepolymer containing the isocyanato groups, said quasi-prepolymer then being combined with added polyol, blowing agent and such other ingredients as desired to provide a finished foam. This provision of a quasi-prepolymer within itself was objectionable because it increased the operations involved in the foam production. Also, the finished foams obtained tended to be somewhat fragile.

There did not appear to be any satisfactory method of circumventing these objectionable features because, as mentioned herein, the phosphorus-containing polyol component, such as the reaction product of phosphoric acid and ethylene glycol which was then reacted with alkylene oxide, when used in conventional manner as a single fire retardant agent, did not produce satisfactory flame retardant foams.

This invention comprises the provision of a process by use of which fire retardant polyurethane foams are obtained by a single stage or "one shot" technique, and concurrently, the requirements for the synergistic effect of a phosphorus polyamide component in combination with a phosphorus polyol has been obviated.

It has now been discovered that the same phosphorus polyols which have only been used synergistically with phosphorus polyamides and which were not effective when used singly in the previously suggested foamable mixtures, can in fact be used highly effectively in certain other polyurethane foams without phosphorus polyamide. The key to this success resides in the use of the phosphorus polyol in combination with a certain class of polyisocyanates, namely, one of those containing from 2.3 to 6 isocyanato groups per molecule and containing essentially no urethane linkages. These provide highly effective fire retardant foams when used in a "one shot" technique and, also, the necessity of a phosphorus polyamide component is obviated.

That only this type of polyisocyanate produces good fire retardant foams is surprising since other polyfunctional polyisocyanates, such as the prepolymers which may have a high functionality, such as that in a range of 2.3 to 6, but further have urethane linkages, do not produce satisfactory foams.

In accordance with the provisions of the present invention, a foamable mixture is provided wherein the main components are:

(1) A polyol containing at least 4 hydroxyl groups and usually 6, or better still, 8 hydroxyl groups, the molecules of said polyol consisting essentially of atoms of carbon, hydrogen and oxygen. This polyol preferably is a polyether polyol which is formed by reacting a glucoside or saccharide with an alkylene oxide, (2) An isocyanato compound, at least a substantial part of which contains at least 2.3 isocyanato groups per molecule, and (3) A polyol component which is a product of oxyalkylation of an acid ester of a monohydric or polyhydric alcohol and an acid containing the phosphoryl or thiophosphoryl group

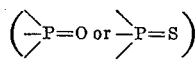

These oxyalkylation products of an acid ester of an acid containing a

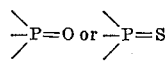

group have been found to be relatively inexpensive to produce. Moreover, when they are used with a polyisocyanate compound of a functionality greater than 2, they are highly effective in promoting fire retardancy in the polyurethane resin foams, even in the absence of a phosphoryl polyamide.

Moreover, the foams do not absorb substantial amounts of water and they will withstand long periods of humid aging without losing their fire retarding properties and other desirable characteristics. As a still further desirable characteristic, these new foams have been found to be of excellent cellular structure and of good strength and resistance to crumbling.

The several components of the foamable mixtures which are contemplated by this invention will be discussed as individual units.

THE POLYISOCYANATO COMPONENT

The polyisocyanato component used in forming the foams of this invention should contain about 2.3 to about 6 isocyanato ($N=C=O$) groups per molecule. These values manifestly constitute average values within the molecule. Doubtless, some molecules may contain only 2 isocyanato groups, while others may contain 4 or 6. The average, in most instances, will fall within the range of 2.4 to about 3.5. It is a characteristic of the polyisocyanato component as herein used that it does not contain any appreciable number of preformed urethane

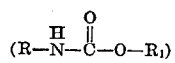

linkages in the average molecule. Therefore, it is substantially different from so-called prepolymers which, although they may contain some molecules with 3 or even more isocyanato groups per molecule, are characterized by the presence of such linkages in such molecules, the linkages being formed by reaction of hydroxyl groups of the polyol with a part of the isocyanato groups in well-known manner. Such prepolymers are not satisfactory for use in the foams herein contemplated.

The polyisocyanato component employed in the practice of the present invention may be represented by the formula: $R(N=C=O)_x$, wherein R is usually hydrocarbon and may be a chain-like hydrocarbon comprising methyl, ethyl, propyl or aralkyl groups in various arrangements, and $x$ is a number as aforesaid having an average value in a range of about 2.3 to about 6, representing the number of isocyanato groups replacing hydrogen in the hydrocarbon portion of the molecule.

Examples of such polyisocyanato compounds that may be used comprise diphenyl methane diisocyanate, often designated for brevity as MDI, which in spite of its name, actually has an isocyanato functionality of about 2.5 and therefore must contain a considerable number of molecules, such as:

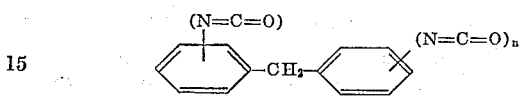

wherein $n$ has a value of at least 1.4. In some instances, $n$ may even be 3. Suitable branched polyisocyanates which may be used as the polyisocyanato components in the practice of this invention may also be aralkyl polyisocyanates that correspond to those of United States Patent No. 2,683,730 to Seeger et al. These polyisocyanato compounds are represented by the generalized formula:

$$O=C=N-R(CY_2R'-N=C=O)_n$$

wherein R and R' are arylene radicals, Y is selected from the group consisting of hydrogen, alkyl and aryl radicals, and $n$ is a number which, in accordance with the provisions of the present invention, should be within a range of about 1.3 to 3.5 or 4. One such compound may be represented by the formula:

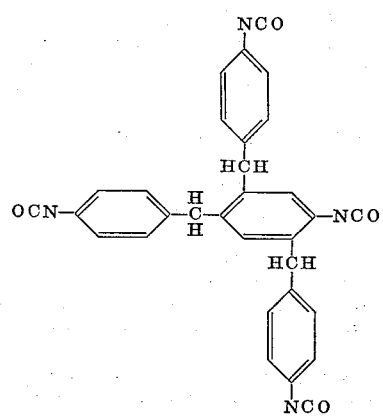

Methods of preparing such isocyanato compounds are adequately described in the aforementioned patent.

Linear aralkyl polyisocyanato compounds wherein the hydrocarbon portion of the molecule is linear or straight chain and comprise alternating aryl and alkylene groups, are represented by the commercial material sold under the tradename of PAPI. These compounds may be designated by the structural formula:

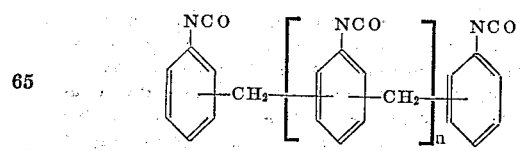

wherein $n$ is a small number, e.g., 1 to 4. The material is termed "polymethylene polyphenylisocyanate." The average molecular weight usually is within a range of 380 to 400. The isocyanate equivalent is 135 maximum and the functionality averages approximately 3 or slightly above. Therefore, it may be considered that $n$, on the average, is approximately 1.

Other isocyanato compounds which are free of urethane and urea linkages, which are of an isocyanato equivalency in excess of 2.3 and which therefore may be used in the practice of the invention, comprise:

1,2,4-benzene triisocyanate
    1,2,2-triisocyanato butene
    1,3,3-pentane triisocyanate
    1,2,4-butane triisocyanate
    Triphenylmethane triisocyanate These polyisocyanates may be used singly or in a mixture with each other, or with some addition of a diisocyanate such as:

Toluene diisocyanate
Diphenyl diisocyanate
Triphenyl diisocyanate
Chlorophenyl-2,3-diisocyanate
Eethylene diisocyanate
1,4-tetramethylene diisocyanate
P-phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenylisocyanate
Diphenylmethane-4,4'-diisocyanate Presently preferred polyisocyanato compounds comprise polymethylene polyphenylisocyanate (PAPI), methylene diisocyanate (MDI) which, as previously explained, actually has an isocyanato functionality of about 2.5 and therefore contains a substantial number of molecules containing 3 or more isocyanato groups.

These polyisocyanate components are advantageously used in a so-called "one shot" system, wherein they are stored separately from the polyol components, including the phosphorus polyol, until the foam is to be formed. The polyisocyanato component is then added to the other components which may, if preferred, be made up into a preformed masterbatch mixture constituting what may be termed "package (B)," to which the polyisocyanato component (A) is added as rapidly as practicable. The mixture is then allowed to foam and cure. The total of the polyisocyanate will usually approximate equivalency with respect to the active hydrogen atoms in the mixture and usually being represented by the hydrogen atoms of the hydroxyl groups.

THE PHOSPHORUS POLYOL FLAME RETARDANT

In the preparation of phosphorus polyols which may be used without inclusion of phosphoryl amide synergists as fire retardant agents in the formulation of the polyurethane resin foams, an acid ester of an oxyacid of phosphorus and a monohydric or polyhydric alcohol is initially prepared. The acid esters may be prepared by reacting an alcohol with phosphoric acid per se or, preferably, the anhydride thereof. The preferred acid is orthophosphoric acid ($H_3PO_4$) or better still, its anhydride ($P_2O_5$). However, the invention also includes the use of other acids containing the

group or anhydrides thereof; these include:

Phosphorus acid ($H_3PO_3$)
    Meta-phosphoric acid
    Pyrophosphoric acid
    Isophosphoric acid
    Polyphosphoric acid and the oxides or anhydrides of these (where they exist), and being represented by $P_2O_5$, $P_2O_4$ and $P_2O_3$. The acid (or anhydride) is reacted with the ancohol component in conventional manner to provide an acid ester which may be either the monoester or the diester, and may be represented by the following formulae:

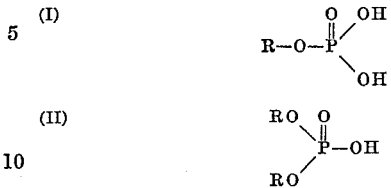

In the foregoing formulae, groups R are alkyl groups, hydroxyalkyl groups, alkoxyalkyl groups, hydroxyalkoxyalkyl groups, aromatic (benzene) groups or hydroxybenzene groups, and may be represented by ethyl, methyl, propyl, isopropyl, isobutyl, tertiary butyl or amyl. It will be apparent that mixtures of the monoester and the diester may also be included. These esters still contain one or more acid —OH groups of phosphoric acid. One of the preferred materials is mixtures of lower alkyl mono- and diesters having an average hydroxyl functionality greater than 1.0 and less than 2.0. More preferably, the hydroxy functionality is 1.5 or greater and less than 2.0.

The phosphorus polyols may also be prepared by the interaction of mono-alcohols and glycols with phosphoric acid rather than with phosphorus pentoxide. This reaction does not occur as smoothly as with phosphorus pentoxide and more complex phosphate acidic esters are obtained.

The acid esters of the alcohol and the phosphorus containing acid may be reacted with alkylene oxide molecules, each containing a group (preferably single)

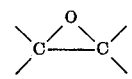

which may be termed an oxirane ring. Appropriate oxides comprise ethylene oxide, propylene oxide, butylene oxide (1,2 or 2,3) or styrene oxide. These oxides may be reacted under pressure with the acid ester above described. The resultant oxyalkylation products may be presented by the formula:

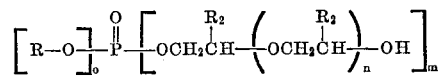

wherein $n$ is a number from 0 to 6, $m$ is a number from 1 to 2, and $o$ is a number from 1 to 2, the sums of the numbers $o$ and $m$ being equal to 3. R is the same as in Formulae I and II, and $R_2$ is hydrogen, —$CH_3$ or $CH_2CH_3$. This material, it will be observed, is terminated in each of the oxyalkylation said chains by a hydroxyl group so that the material contains active hyrogen atoms and is adapted to react with the polyisocyanate component to form portions of the polyurethane molecules. The material will usually be essentially neutral and will have a hydroxyl number in a range of about 150 to about 400. The amount of alkylene oxide used in the oxyalkylation may be in a range of about 1 to about 12 moles per mole of acid ester of phosphoric acid.

In performing the oxyalkylation involved in the preparation of the phosphorus polyols, various embodiments of apparatus may be used, for example, the acid ester of phosphoric acid may be contained in a reaction vessel, such as a flask equipped with agitators, temperature controls and a feed for alkylene oxide, or preferably, an autoclave wherein the temperature of the reaction components and the rate of addition of alkylene oxide can be controlled.

THE NON-PHOSPHORUS POLYOL COMPONENT OF THE RESIN

The polyols consisting essentially of carbon, hydrogen and oxygen which may be employed in the practice of the present invention preferably comprise oxyalkylation products of a saccharide or glucoside, such as sucrose, fructose, glucose and sorbitol, containing at least 3 and usually 6 to 8 hydroxyl groups per molecule. Presently, sucrose, because of its availability and low cost, constitutes the preferred starting polyol for oxyalkylation. The oxyalkylation products usually have a hydroxyl number in a range of about 150 to about 700. Preferably, the oxyalkylation of glucoside or saccharide is effected with an oxirane compound of relatively low molecular weight containing but a single oxirane ring and being represented by ethylene oxide, propylene oxide and butylene oxide. Butylene oxide, if used, may be either the 1,2 or the 2,3 oxide isomer. Obviously, mixtures of the 1,2 and 2,3-butylene oxide isomers could also be used in effecting the reaction. Styrene oxide may also be used to satisfy all of, or a part of, the requirements for oxirane compound.

The alkylene oxide or oxirane compound may be employed in a proportion in excess of equivalency with respect to the hydroxyl groups of the saccharide compound which is being oxyalkylated. For example, in the instance of sucrose, the ratio of alkylene oxide preferably is in a range of about 10 to about 30 moles per mole of sucrose, so that at least a part of the ether chains formed will contain a plurality of oxyalkyl units. The preparation of such compounds is disclosed in detail in U.S. Patent 3,153,002, issued Oct. 13, 1964. The method consists essentially of dissolving the sucrose in a small amount of water, e.g., about 5 percent to about 17 percent of water, in a pressure container, such as an autoclave, and contacting the resultant solution with the alkylene oxide under pressure until a desired degree of oxyalkylation has been obtained. The reaction may be catalyzed with a base, such as sodium hydroxide, sodium carbonate or sodium acetate, the amount thereof being within a range of about 1 percent to about 10 percent. When oxyalkylation is completed, the water and any other volatile components present may be removed by evaporation.

The polyether polyol products of the references are characterized by viscosities in a range of about 2000 to about 400,000 centipoises, hydroxyl values in a range of about 250 to about 750, and molecular weights of about 700 to about 1800.

A second method of oxyalkylating sucrose is disclosed in U.S. Patent 3,085,085, issued Apr. 9, 1963. According to the method disclosed in the latter, the sucrose is initially dissolved in a small amount of water, as disclosed in the first-mentioned patent, and is then partially oxyalkylated, e.g., to the extent that about 6 moles of alkylene oxide are reacted with the hydroxyls of the sucrose, the water is then removed and further oxyalkylation is conducted to obtain side chains with a plurality of ether linkages, each chain being terminated by a hydroxyl group.

In the instance of the preferred polyols, namely, the oxyalkylation products of sucrose, the polyether polyols may be represented by the formula:

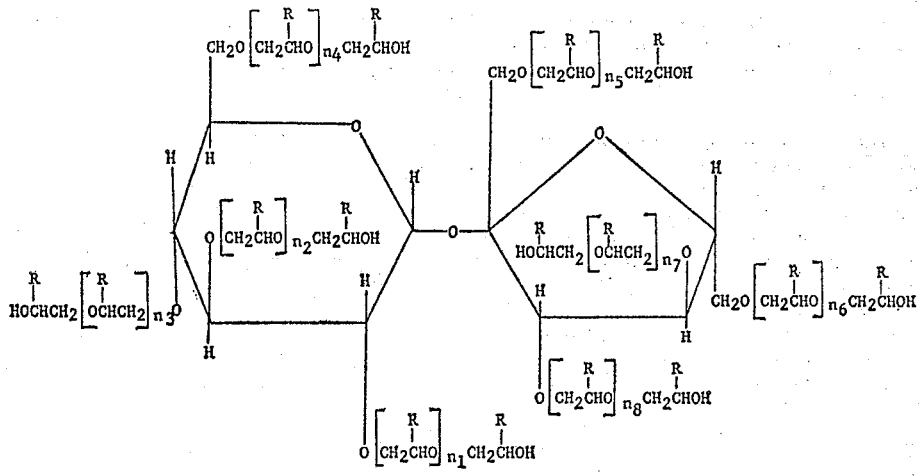

In the formula, R is —H or —CH$_3$, and $n_1$, $n_2$, $n_3$, $n_4$, $n_5$, $n_6$, $n_7$ and $n_8$ are whole numbers from 0 to 8 and their sums being in a range of about 2 to about 18, dependent upon the number of ethylene oxide, propylene oxide or 1,2-butylene oxide molecules introduced. The sucrose polyether polyols will normally have a hydroxyl number in a range of about 200 to about 600.

Similar techniques may be employed in the oxyalkylation of other saccharides, such as fructose, glucose or sorbitol, or mixtures thereof such as are represented in invert sugar, etc. Oxyalkylated starch or oxyalkylated cellulose may also be used. Mixtures of sucrose and glucosides such as methyl glucoside, may be used as the polyol component in the foams of this invention.

CATALYSTS OF URETHANE FORMATION

In order to form polyurethane linkages between the polyol component or components and the polyisocyanate component in the resin-forming reaction, it is often preferable to include a catalyst material of urethane formation. Appropriate catalysts, when used, comprise:

Tetramethyl guanidine
Tetramethyl-1,3-butanediamine
Triethylenediamine (sold as DABCO)
Dimethylethanolamine Likewise, esters of tin, such as:

Stannous oleate
Stannous octoate
Dibutyl tin dilaurate and others may be used. In those instances where large amounts of polyols containing tertiary amino groups or where a rapid reaction is not required, the catalyst component may be omitted. Catalysts, if employed, are preferably used in an amount of about 0.1 percent up to about 5 percent by weight based upon the reactive components in the foamable mixture.

BLOWING AGENTS FOR THE POLYURETHANE-FORMING MIXTURE

Recognized systems for effecting the release of a gas in the foamable mixture wherein the polyurethane-foaming mixture may be employed, for example, a small amount of water, e.g., about 1 percent to about 3 percent by weight based upon the reactive components of the foamable mixture, may be included in order to react with a portion of the isocyanato groups and thus to generate carbon dioxide in situ. If preferred, carbon dioxide may also be generated separately and whipped into the foamable mixture, or may be introduced therein by pressure or by a combination of whipping and pressure operations. When carbon dioxide under sufficient pressure is used, it goes into solution and when pressure is released, it separates as bubbles to provide a foam.

A preferable system of foaming comprises the addition of the polyurethane-foaming mixture of a blowing agent, such as a chlorofluorocarbon represented by $CCl_3F$, $CCl_2F_2$, and others of this family, which can be incorporated in a solution in the polyurethane-foaming mixture and allowed to volatilize to effect blowing or foaming as the mixture exothermically cures.

Combinations of carbon dioxide and chlorofluorocarbon, e.g., about equal parts by volume of each, may be used. It is often preferred to cool the foamable mixture or the component thereof to which the blowing agent is added, to prevent premature volatilization of the latter. Temperatures of about 50° F. to about 60° F. in the liquid may be used to facilitate foaming. When urethane formation is initiated, the temperature rises exothermally to release the blowing agent before the mixture gels or sets.

The amount of blowing agent used will depend upon the density desired in the foam. This usually will be in a range of about 1 to about 10 pounds per cubic foot, though for special purposes, higher or even lower densities may be desired. In event that the blowing agent is a chlorofluorocarbon, about 5 percent to about 40 percent by weight based upon the foamable mixture may be used.

AUXILIARY AGENTS

In addition to the foregoing main components, the reaction mixture employed in forming polyurethane resin foams may also include additives designed to promote the stability and cellularity of the foams obtained. For example, emulsifying amounts, e.g., about 0.1 percent to 3 percent, of surfactants such as are conventionally employed in the formation of polyurethane foams may be included. Appropriate surfactants comprise the liquid silicone resins, such as Silicone 521. Silicone 521 is approximately of the formula:

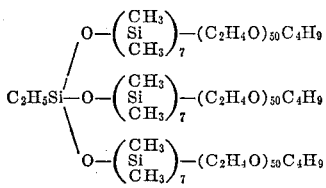

(United States Patent No. 3,034,996). Other surfactants may be employed to promote foaming, including the ionic and nonionic emulsifiers, such as Tween 20, which is the polyoxyethylene sorbitan monolaurate; Tween 40, which is the polyoxyethylene sorbitan monopalmitate; Triton X-100, which is isooctylphenyl polyethoxyethanol, and others.

Likewise, additives designed to increase the stability of the foams optionally may be added, examples of the latter materials being cellulose ethers, such as methyl cellulose, and esters such as cellulose acetate butyrate and others which increase the toughness of the foams during the initial stages before the resin-forming components have had an opportunity to react to give more rigid structures.

In accordance with the provisions of this invention, the reactants may all be combined in a single stage without the intermediate formation of a so-called prepolymer of the polyol component(s) and the polyisocyanate. In the preparation of a foam by such technique, it is desirable to mix the polyether polyol components, catalyst (if one is used), surfactant (if one is used), emulsifying agents and thickeners (if they are used) without the addition of the polyisocyanate component. Such mixtures, of course, so long as the polyisocyanate component is not present, are relatively stable. Upon the addition of the latter component, however, the mixture becomes immediately reactive and will foam and gel at once. Therefore, the polyisocyanate component is held in reserve until immediately before the foaming and curing reaction is to be conducted. In other words, the foamable mixture is made up into two packages (A) and (B). Package (B) comprises the polyol and foam-producing agents, whereas the polyisocyanate constitutes package (A). In some instances, certain of the components that are nonreactive with respect to the polyisocyanate, may also be included in package (B).

The following constitute suggested ranges of properties and proportions of the several components of the foamable mixtures.

|  | Minimum | Maximum |
| --- | --- | --- |
| Polyether polyol (hydroxyl number) | 300 | 750 |
| Hydroxy phosphoryl esters (fire retardant), percent | 3 | 20 |
| Blowing agent (chlorofluorocarbon), percent | 5 | 20 |
| Surfactant, percent | 0.005 | 3 |
| Catalyst, percent | 0 | 3 |
| Polyisocyanate/Polyol Index—Polyisocyanate | 0.9 | 1.3 |

It will be understood that the foregoing ranges of proportions are representative. In some instances, the proportions may be outside of the foregoing limits.

The mixing of the components of the foamble compositions may be effected with various agitating devices, such as a conventional turbo-mixer. The mixture is introduced into a mold or is applied to a support. The exothermal rise in the mixture is usually adequate to volatilize the blowing agent and cure the mixture, but if the foam body is thin, it is not precluded to apply additional heat to speed up the process.

While it is often possible to purchase acid esters of the phosphorus-containing acids as commercial products and then to react them with alkylene oxide to provide a substantially neutral ester, it will be understood that some of these may not at present be available and for that reason, it may sometimes be desirable for the user to make up the acid esters in his own plant. The following examples illustrate the preparation of typical acid esters of oxyacids of phosphorus which may further be subjected to reaction with an alkylene oxide to provide hydroxyphosphoryl esters that may subsequently be used as fire retardant agents in the polyurethane resin foams.

Example A

In accordance with the provisions of this example, phosphorus pentoxide was reacted with butanol to provide an acid ester. The reaction components comprised:

|  | Grams |
| --- | --- |
| n-Butanol (3 moles) | 222 |
| Phosphorus pentoxide (0.48 mole) | 69 |

The n-butanol was heated to refluxing temperature in the flask and the phosphorus pentoxide was added in increments of about 10 grams each; the mixture was allowed to reflux after each addition. When the mixture ceased to evolve heat and the reflux subsided, the temperature was slightly raised in order to assure completion of the reaction. The product was then stripped under vacuum. The product recovered was of a weight of 184 grams and had an acid value of 442. The phosphorus content was 17.18 percent as against a theoretical phosphorus content of 16.4 percent. This product was suitable for further oxyalkylation in order to provide a phosphorus polyol suitable for use as a fire retardant in the practice of this invention.

Example B

In accordance with the provisions of this example, mono-dibutyl acid ortho-phosphate was prepared. The reaction charge in this instance comprised:

| | Grams |
|---|---|
| n-Butanol | 889 |
| Phosphorus pentoxide | 297 |

The mixture was charged into a 2-liter, 4-necked glass flask equipped with a glass stopper, a thermometer, a water condenser and a stirrer. The n-butanol was heated in the flask to reflux temperature and the phosphorus pentoxide was added in increments as refluxing continued. A total time of 1 hour and 15 minutes was required to incorporate the phosphorus pentoxide. The mixture was reacted until esterification was complete, after which the mixture was cooled and was stripped of n-butanol under vacuum. The acid value of the product was 432 as against a theoretical acid value of 462. The phosphorus content was 16.99 percent as against a theoretical phosphorus content of 17.0 percent. The acid ester was suitable for further oxyalkylation with propylene oxide, butylene oxide or ethylene oxide to provide a useful fire retardant for the resin foams of this invention.

Example C

In accordance with the provisions of this example, esters of isooctanol and phosphorus pentoxide were prepared. The charge comprised:

| | Grams |
|---|---|
| Isooctanol (mixed isomers) | 1560 |
| Phosphorus pentoxide | 426 |

The procedure was essentially the same as that already given. The product was stripped and a recovery of 1635 grams was obtained. This product had an acid value of 324 and a phosphorus content of 11.94 percent as against a theoretical phosphorus content of 11.6 percent. The product could be reacted with alkylene oxide to provide a phosphorus polyol useful as a fire retardant agent in the polyurethane resin foams herein disclosed.

Example D

This example illustrates the preparation of the 2-ethylhexanol ester of phosphoric acid by reaction of 2-ethylhexanol and phosphorus pentoxide. The reaction charge comprised:

| | Grams |
|---|---|
| 2-ethylhexanol (3 moles) | 390.6 |
| Phosphorus pentoxide (0.75 mole) | 106.0 |

The procedure and apparatus substantially corresponded to that of the preceding examples. The resultant product was stripped and 400.3 grams of product were recovered. This product had an acid value of 279.8 as against a theoretical acid value of 316. The phosphorus content was 12.05 percent as against a theoretical phosphorus content of 11.6 percent.

It may be further oxyalkylated to provide a fire retardant hydroxyalkyl phosphoryl ester for use in the practice of this invention.

Example E

This example is typical of the reaction of a diol (ethylene glycol) with phosphoric acid to provide an acid ester of phosphoric acid. The reaction mixture comprised:

| | | |
|---|---|---|
| Phosphoric acid (85 percent) (4 moles) | grams | 460 |
| Ethylene glycol (2 moles) | do | 124.2 |
| Xylene (solvent) | milliliters | 400 |

These were reacted in the manner already described, in a flask equipped with reflux condenser, thermometer and heating means. The reaction was conducted at a temperature in a range up to about 137° C. over a period of about 9 hours and 25 minutes. During the reaction, 131 grams of water were removed. The reaction product was stripped under a vacuum of 10 millimeters of mercury (absolute) to provide a yield of 447 grams of a product having an acid value of 675.

This product was suitable for oxyalkylation with propylene oxide in forming a fire retardant.

Example F

RUN 1

In accordance with the provisions of this run, an acid ester of 2-ethylhexanol and phosphoric acid was obtained by the reaction of 2-ethylhexanol and phosphorus pentoxide. The reaction charge comprised:

| | Grams |
|---|---|
| 2-ethylhexanol | 1171 |
| Phosphorus pentoxide | 318 |

2-ethylhexanol was charged into the reactor first and the phosphorus pentoxide was added gradually. Reaction was continued over a period of 5 hours and 45 minutes. After stripping of 2-ethylhexanol, the yield with 1196.2 grams of a product having:

| | Percent |
|---|---|
| Phosphorus content | 11.18 |
| Acid value | 287.37 |

The product was also suitable for oxyalkylation in accordance with the provisions of this invention, to provide fire retardant additives for polyurethane resin foams.

RUN 2

A similar reaction was conducted in the preparation of the acid ester of isodecanol and phosphorus pentoxide. The reaction charge comprised:

| | Grams |
|---|---|
| Isodecanol (10 moles) | 1583 |
| Phosphorus pentoxide (2.5 moles) | 355 |

The isodecanol was charged into the reaction flask and the phosphorus pentoxide was added gradually. The temperature of the reaction mixture was maintained in a range of about 105° C. to 120° C. The reaction was continued over a period of 4 hours. The volatile constituents of the reaction product were distilled to provide a yield of 1631 grams of a product having the following properties:

| | Percent |
|---|---|
| Phosphorus content | 10.16 |
| Acid value | 269 |

The uses of this material were the same as above described.

The following examples illustrate the reaction of acid esters of phosphoric acid to provide hydroxyalkyl phosphoryl esters which are fire retardants in polyurethane foams wherein the polyisocyanate component has an isocyanato functionality of about 2.3 to 6 and does not contain an appreciable number of urethane groups.

Example G

The acid ester of this example was that obtained by reacting:

| | Grams |
|---|---|
| 2-ethylhexanol | 1560 |
| Phosphorus pentoxide | 425 | and adding the phosphorus pentoxide to the 2-ethylhexanol in increments. Excess of 2-ethylhexanol was removed by vacuum stripping. The resulting product had the following properties:

| | |
|---|---|
| Acid value | 287.32 |
| Phosphorus content percent by weight | 12.02 |

For purposes of oxyalkylation, this phosphorus polyol comprised:

| | Grams |
|---|---|
| Mono- and di-2-ethylhexyl acid phosphate | 1344 |
| Total propylene oxide | 991 |

The propylene oxide was added in increments while the temperature was maintained within a range of approximately 80° F. to 196° F. The reaction time was approximately 3 hours and 27 minutes. The product was stripped of volatile material under vacuum to obtain a yield of 1873 grams of polyol have the following properties:

| | |
|---|---|
| Hydroxyl number | 238 |
| Phosphorus content | 8.47 |

This product could be used in the practice of this invention to impart fire retardancy to the polyurethane resin foams.

Example H

In accordance with this example, an acid ester of phosphoric acid was prepared by reacting ethylene glycol with said phosphoric acid. The reaction charge comprised:

| | Grams |
|---|---|
| Phosphoric acid (85.1 percent concentration) (2 moles) | 230 |
| Ethylene glycol (1 mole) | 62 |

To the mixture was added 200 milliliters of xylene. The mixture was heated in a flask equipped with an agitator, a reflux condenser and a thermometer. The reaction was continued for 6 to 6.5 hours and 68 grams of water were removed. The xylene was stripped off under vacuum and the product was heated to 90° C. to 95° C. for 30 minutes.

| | |
|---|---|
| Yield grams | 220 |
| Theoretical yield do | 222 |
| Acid value | 806.8 |

The foregoing acid esters of phosphoric acid and ethylene glycol were subjected to oxyalkylation with propylene oxide as follows. The total charge employed in the reaction comprised:

| | Grams |
|---|---|
| Acid esters | 149 |
| Propylene oxide | 430 |

In the reaction, the acid esters were charged into a flask and the propylene oxide was then added with stirring. As the reaction was continued, the mixture became so viscous that stirring was difficult and a 20-milliliter quantity of dioxane was added. When the reaction tended to become overly energetic, cooling was applied. At the end of 6 hours and 40 minutes, all of the propylene oxide had been introduced. The dioxane employed to dilute the mixture was distilled off at a temperature of 60° C. to 65° C. under vacuum and was held for 1½ hours at a pressure of 20 to 25 millimeters of mercury while nitrogen gas was bubbled through the mixture to complete the removal of volatile ingredients. A 75 percent yield of a product which had a hydroxyl value of 361.5 was obtained.

Example I

RUN 1

In accordance with the provisions of this run, a commercial butyl acid ortho-phosphate was subjected to oxyalkylation reaction with propylene oxide. The apparatus employed as a conventional reactor. The total reaction charge comprised:

| | Grams |
|---|---|
| Butyl acid orthophosphate (12.25 equivalents) | 1385 |
| Propylene oxide (19.2 moles) | 1115 |

In the reaction, the butyl acid ortho-phosphate was introduced into the reactor and the addition of propylene oxide was initiated. It was necessary to control the exothermic reaction in the range of 140° F. to 270° F. by adjustment of the rate of addition of the propylene oxide and, when necessary, by the application of cooling water to the reaction vessel. The reaction was continued for a period of about 3½ hours.

The product was stripped under vacuum. A yield of 2463 grams was obtained. The product had the following characteristics:

| | |
|---|---|
| Hydroxyl number | 336.9 |
| Acid value | 6.23 |
| Phosphorus content percent | 9.59 |
| pH | 2 |

This oxyalkylation product was suitable for incorporation with foamable mixtures of polyols consisting essentially of carbon, hydrogen and oxygen, and polyisocyanates containing a substantial number of molecules with at least 3 isocyanato groups, in a single shot operation whereby to provide valuable fire resistant polyurethane resin foams.

Substantially the same reaction was conducted with a mixture of monobutyl acid ortho-phosphate prepared by reacting butyl alcohol and phosphorus pentoxide in conventional manner. The reaction charge comprised:

| | Grams |
|---|---|
| Monobutyl acid ortho-phosphate (9.25 equivalents) | 1000 |
| Propylene oxide (23.2 moles) | 1340 |

The crude product was stripped of volatile matter to give 1935 grams of a finished product having the following characteristics:

| | |
|---|---|
| Acid value | 0.41 |
| OH value | 350.4 |
| Phosphorus content percent | 9.58 |

RUN 2

In accordance with the provisions of this run, mono-dibutyl acid ortho-phosphate was reacted with propylene oxide to provide a nearly neutral phosphate ester. In the reaction, the total charge comprised:

| | Grams |
|---|---|
| Mono-dibutyl acid ortho-phosphate | 1100 |
| Propylene oxide | 1240 |

The propylene oxide was added in increments. The reaction was continued over a period of about 3 hours and 18 minutes, the temperature of reaction being within a range of 150° F. to about 200° F. After the reaction was completed, the reaction vessel was drained and excess propylene oxide was stripped off at a temperature up to 100° C. under a pressure of 10 millimeters of mercury (absolute). A yield of 1846.6 grams was obtained. The product had the following characteristics:

| | |
|---|---|
| Hydroxyl number | 261.33 |
| Acid value | 0.11 |
| Phosphorus content percent | 10.41 |

This product was suitable for addition to foamable mixtures to provide urethane foams having high resistance to burning.

Example J

In accordance with this example, mono-dimethyl acid ortho-phosphate was reacted with propylene oxide to provide a substantially neutral ester. The reaction charge comprised:

| | Grams |
|---|---|
| Mono-dimethyl acid ortho-phosphate | 650 |
| Propylene oxide (total) | 2000 |

The mono-dimethyl acid ortho-phosphate was added to a reactor first and the addition of the propylene oxide was regulated in order to maintain a reasonable temperature, e.g., in a range of about 150° F. to 180° F. A total time of about 6 hours and 45 minutes was required in the reaction.

The product was stripped under vacuum as in the previous examples. The yield was 1445 grams of a product having the following characteristics:

| | |
|---|---|
| Acid value | 0.39 |
| Hydroxyl number | 299.9 |
| Phosphorus content percent | 11.20 |

This product, like those previously described, could be used in the fireproofing of polyurethane resins by a single shot operation using a polyol consisting essentially of carbon, hydrogen and oxygen, and a polyisocyanate having at least about 2.3 isocyanato groups per molecule.

Example K

In accordance with the provisions of this example, the acid ester of octanol and phosphorus pentoxide was prepared. The acid ester was reacted with propylene oxide, the total charge comprising:

| | Grams |
|---|---|
| Acid ester of octanol (same as Example C) | 1500 |
| Propylene oxide | 1055 |

The acid ester was charged into a reactor and heated to 150° F. The propylene oxide was then added in 100-gram parts until complete addition was obtained, the additions being spaced to allow nearly complete reaction of each portion before the next was added. The total reaction time was approximately 4 hours and 10 minutes. The yield obtained was 2410 grams of a product which was distilled to remove any unreacted propylene oxide under a pressure of 10 millimeters of mercury up to a pot temperature of 100° C. The final yield was 2094 grams of a product having the following characteristics:

| | |
|---|---|
| Acid value | 0.25 |
| Hydroxyl number | 231 |
| Phosphorus content _____percent__ | 8.10 |

Example L

The acid phosphate ester of this example was the same as that produced from n-butanol and phosphorus pentoxide. The ester had an acid number of 467. The total charge of reactants comprised:

| | Grams |
|---|---|
| Acid phosphate ester | 1100 |
| Propylene oxide | 1200 |

The propylene oxide was added in increments as in the preceding examples, over a period of approximately 1½ hours at a temperature within a range of 150° F. to about 200° F. The product was stripped of unreacted propylene oxide up to a temperature of about 100° C. and under a vacuum of 10 millimeters of mercury to provide a substantially neutral ester product in a weight of 1829.5 grams. The product had the following properties:

| | |
|---|---|
| Acid value | 0.52 |
| Hydroxyl number | 267.7 |
| Phosphorus content _____percent by weight__ | 10.1 |

This product, when used with an isocyanato component of a functionality of 2.3 or above, was a useful fire retardant.

Example M

In this example, the acid ester was a mixture of mono- and dibutyl acid ortho-phosphates. The total reaction charge comprised:

| | Grams |
|---|---|
| Mixed mono- and dibutyl acid ortho-phosphates | 242 |
| Propylene oxide | 232.4 |

The phosphoric acid esters were introduced into a reaction flask having a Dry Ice condenser, and the propylene oxide was added in increments as it was used up in the reaction. The temperature was maintained by cooling within a range of about 22° C. to 35° C. The total reaction time was 4 hours and 31 minutes. The reaction mixture was finally held for 1 hour at a temperature of 80° C. The crude product was then subjected to stripping. A yield of 445.6 grams was obtained. The ester product had the following characteristics:

| | |
|---|---|
| Acid value | 1.38 |
| Hydroxyl number | 277.88 |
| Phosphorus content _____percent__ | 9.5 |

Example N

In accordance with the provisions of this example, mono- and dibutyl acid ortho phosphate was prepared by reacting:

| | Grams |
|---|---|
| n-Butanol | 2222 |
| Phosphorus pentoxide | 710 | in the manner already described. The resultant product was of an acid value of 464 and a phosphorus content of 17.2 percent by weight.

A further charge was made up comprising:

| | Grams |
|---|---|
| Acid ester (as above described) | 1000 |
| Propylene oxide | 1200 |

The acid ester was heated to 150° F. in the reactor and the propylene oxide was added in increments, the temperature of reaction being maintained within a range of about 145° F. to about 200° F. At the conclusion of the reaction, the product was stripped under vacuum at a temperature up to 100° C. The resultant product weighed 1604 grams and was filtered with a filter aid to obtain a purified product of a weight of 1546 grams. The product had the following characteristics:

| | |
|---|---|
| Acid value | 0.49 |
| Hydroxyl number | 292.5 |
| Phosphorus content _____percent by weight__ | 10.62 |

The resultant phosphate could be used as a fire retardant in the preparation of the polyurethane foams of this invention.

Example O

The acid phosphate ester of this example was that of isodecanol and corresponds to that of Example F, Run 2. The total charge to the reactor comprised:

| | Grams |
|---|---|
| Acid ester (Example F, Run 2) | 1500 |
| Propylene oxide | 915 |

The propylene oxide was added in increments as were required to maintain the temperature in the reaction vessel, the maximum reaction temperature being 200° F. A total reaction time of 3 hours and 35 minutes was employed. The product was stripped of volatile components under vacuum to provide a partially purified product weighing 2011 grams. This product was filtered to provide a purified product characterized by:

| | |
|---|---|
| Acid number | 0.66 |
| Hydroxyl value | 206 |
| Phosphorus content _____percent by weight__ | 7.4 |

This was a useful fire retardant for employment in foams wherein the isocyanato component was of a functionality of 2.3 or above and wherein there were few or no urethane linkages.

Example P

This example illustrates the oxyalkylation of an acid ester of phosphoric acid wherein the acid ester employed was that obtained by reacting a charge comprising:

| | Moles |
|---|---|
| $H_3PO_4$ | 3.09 |
| $P_2O_5$ | 1.0 |
| Ethylene glycol | 2.68 |

The acid value of the product was 808 and the phosphorus content was 27.68 percent.

In order to form an oxyalkylation product of this material, a charge was prepared comprising:

| | Grams |
|---|---|
| Acid ester (as above described) | 950 |
| Propylene oxide | 1840 |

In the reaction, the acid ester was charged into a reactor and was heated to 150° F. The propylene oxide was added at a rate to maintain a reasonable pressure in the system, the system being cooled to maintain a temperature below about 236° F. The reaction was continued for 6 hours and 48 minutes. The reaction product was subjected to stripping to remove any unreacted propylene oxide. A yield of 2143 grams was obtained having the following characteristics:

| | |
|---|---|
| Acid value | 3.25 |
| Hydroxy number | 343.8 |
| Phosphorus content _____percent | 10.05 |

This product was suitable for use as a fire retardant in a polyurethane foam wherein the isocyanato component was of a functionality above 2.3 and was substantially free of urethane linkages.

Example Q

This example is illustrative of the oxyalkylation of the acid phosphate obtained by reacting a mixture comprising:

| | Moles |
|---|---|
| P$_2$O$_5$ | 1 |
| Propylene glycol | 1 |
| n-Butanol | 1.82 |

The acid value of this product was 535. In order to form an oxyalkylation product, a total charge comprising:

| | Grams |
|---|---|
| Acid ester | 1050 |
| Propylene oxide | 1212 | was used. The acid ester was introduced into a reactor, was heated to 150° F., and the addition of propylene oxide was initiated. The temperature of reaction was maintained below about 230° F. and was continued for a period of 3 hours and 36 minutes. The maximum pressure during the reaction was about 32 pounds.

The crude product was of an acid value of 2.9. It was stripped under vacuum at a temperature up to 100° C. An oxyalkylation product was obtained, having the following characteristics:

| | |
|---|---|
| Acid value | 0.3 |
| Hydroxyl number | 297.4 |
| Phosphorus content _____percent | 10.44 |

This product was also suitable for use as a fire retardant agent when used in a foam wherein the isocyanato component was of a functionality above 2.3 and was substantially free of urethane linkages.

Example R

In accordance with the provisions of this example, an an acid ester of ethylene glycol and n-butanol was prepared by reaction with phosphorus pentoxide, the charge comprising:

| | Moles |
|---|---|
| Ethylene glycol (78.5 pounds) | 1.26 |
| n-Butanol (187 pounds) | 2.55 |
| Phosphous pentoxide (180 pounds) | 1.26 |

This mixture was reacted to provide 400 pounds of a product of the following characteristics:

| | |
|---|---|
| Acid value | 516 |
| Phosphorus content _____percent | 19.4 |

A portion of the resultant mixed acid ester was then further oxyalkylated in the reactor, the total charge comprising:

| | Pounds |
|---|---|
| Acid ester (as above) | 71 |
| Propylene oxide | 70.5 |

The resultant product was of the following characteristics:

| | |
|---|---|
| Acid value | 3.89 |
| OH value | 295.6 |
| Phosphorus content _____percent | 10.85 |

When used in accordance with the provisions of this invention, this material was a good fire retardant for polyurethane foams.

Example S

The acid ester of this example was the mono-di-n-butyl acid phosphate obtained by reacting:

| | Pounds |
|---|---|
| n-Butyl alcohol | 37.2 |
| Phosphorus pentoxide | 17.8 |

The phosphorus pentoxide was incorporated in six additions. The total reaction time was 4 hours and 52 minutes. The acid number of the resultant ester was 464. This acid ester was then oxy-alkylated, the reaction charge comprising:

| | Pounds |
|---|---|
| Mono-di-n-butyl acid phosphate | 45.5 |
| Propylene oxide | 41.5 |

The acid ester was heated to a temperature of 150° F. and the propylene oxide was aded at such rate as would permit control of the reaction. The total reaction time was 6 hours, at the conclusion of which the mixture was vacuum stripped to remove unreacted propylene oxide. A fiinal yield of 66 pounds was obtained, the product having an acid value of 0.17 and an OH value of 278.5.

The fire retardancy of this material, when used in a one-shot foam with a non-urethane polyisocyanate having an isocyanato functionality above about 2.3, was very good.

The following examples are illustrative of the preparation of hydroxyalkyl phosphoryl esters of low acid value by a single stage reaction of the alkylene oxide with phosphoric acid. These have fire retardant properties when used in preparing polyurethane foams wherein the isocyanato component is non-urethane and has a functionality of 2.3 or more. However, the foams are of substandard quality in other respects in that the volume is poor and they remain tacky and uncured even over long periods of time.

Example T

This example illustrates the preparation of an ester of phosphoric acid by reaction of ortho-phosphoric acid with propylene oxide without the intermediate reaction of the acid (or its anhydride) with an alcohol. In accordance with the provisions of the present example, a total charge was prepared comprising:

| | Grams |
|---|---|
| Phosphoric acid (85 percent) | 228 |
| Propylene oxide | 1044 |

The phosphoric acid was charged into a 3-liter, 4-necked flask equipped with a dropping bottle, thermometer, a Dry Ice condenser and a stirrer. The temperature was maintained by means of a water bath within a range of about 25° C. to about 32° C. The propylene oxide was added dropwise and the reaction was continued for a period of about 10 hours and 55 minutes. The reaction product was stripped to remove any unreacted propylene oxide. The resultant product was obtained in a yield of 97.6 percent. The product had the following characteristics:

| | |
|---|---|
| Hydroxyl number | 212 |
| Acid value | 2.41 |
| Phosphorus content _____percent | 5.03 |

The molar ratio of alkylene oxide to phosphoric acid in the final product was 9 to 1.

Example U

This example illustrates the preparation of a propylene oxide-phosphorus polyol by reaction of propylene oxide with phosphoric acid. The total reaction charge comprised:

| | Grams |
|---|---|
| Propylene oxide | 814 |
| Phosphoric acid | 228 |

The reaction was effected by charging the phosphoric acid into a 2-liter, 4-necked flask equipped with a thermometer, stirrer, a condenser cooled with Dry Ice, and a dropping bottle. The reaction was effected over a water bath. The reaction was conducted for a period of about 10 hours. The product was vacuum stripped and had an acid value of 60.18 and a hydroxyl value of 324.3.

Example V

In accordance with this example, propylene oxide was directly reacted with phosphoric acid to provide a phosphorus polyol without intermediate formation of the acid ester. In accordance with the reaction, the total charge comprised:

|  | Grams |
|---|---|
| Phosphoric acid (85 percent) | 228 |
| Propylene oxide | 1044 |

The apparatus employed was a reaction flask equipped with a stirrer, a dropping bottle and a Dry Ice condenser. The phosphoric acid was charged into the flask and the propylene oxide was added dropwise. The reaction was continued over a period of 3 hours and 30 minutes. At the conclusion of the reaction, the product in the flask was purged with inert gas for 2 hours and was then subjected to vacuum stripping to remove any unreacted propylene oxide. A yield of 97 percent was obtained of a product having the following characteristics:

| Hydroxyl number | 420.3 |
|---|---|
| Acid value | 5.98 |

Example W

In accordance with the provisions of this example, the acid ester of glycol and phosphoric acid as prepared in Example E was subjected to oxyalkylation with propylene oxide to provide hydroxyalkyl phosphoryl ester suitable for use as a flame retardant in the polyurethane resin foams of this invention. The total charge comprised:

|  | Grams |
|---|---|
| Acid ester (Example E) (1.44 moles) | 320 |
| Propyl oxide (15.84 moles) | 920 |

The acid ester was dissolved in 300 milliliters of dioxane and the resultant solution was charged into a flask equipped with a dropping bottle, a Dry Ice condenser, a stirrer and a thermometer. The mixture in the flask was stirred and the propylene oxide was added dropwise until addition was complete. The reaction was conducted over a period of about 4 hours and 40 minutes, the temperature being controlled within a range of about 34° C. to 50° C. The resultant product was stripped under vacuum at a temperature of about 15° C. to 32° C.

EXAMPLE 1
"One-shot" system

In accordance with the provisions of this example, a series of "one shot" foams was prepared from a product of reaction of sucrose and an alkylene oxide containing 1 mole of sucrose, 11 moles of propylene oxide and 4 moles of ethylene oxide. The polyisocyanate component in this example comprised a commercial product sold as Mondur MR, which is primarily diphenylmethane-4,4′-diisocyanate, but has an average isocyanato group content of about 2.5 per molecule. The foaming agent was the commercial chlorofluorocarbon ($CCl_3F$) sold as Freon 11. The catalyst employed was triethylenediamine dissolved in a mixture of commercial sucrose polyols made from 1 mole of sucrose, 11 moles of propylene oxide and 4 moles of ethylene oxide. The emulsifier was a conventional silicone emulsifier sold commercially as L–5310. It could be replaced by other emulsifiers such as are herein disclosed. The emulsifier, in each instance, was employed in an amount of 1 percent based upon the mixture.

In each instance, the polyisocyanate as one package (A) was brought to a temperature of about 75° F. and the other components as package (B) were brought to a temperature of 60° F. in order to retain the blowing agent ($CCl_3F$). The several components were mixed together to provide a foamable mixture upon a conventional turbomixer, mixing time being about 15 seconds. In each instance, the mixture was foamed and cured without extraneous heat, and samples of the foam were subjected to humid aging, one set being aged for 1 week, a second set for 2 weeks and a third set for 4 weeks, the temperature of aging being 158° F. and the relative humidity in each instance being substantially 100 percent. The samples at the end of the humid aging tests, were measured for expansion and observed for discoloration. They were then further subjected to flame retardancy tests in accordance with the provisions of ASTM-1692-59T.

The compositions and the results of testing of each of the samples are tabulated as follows:

TABLE I.—"ONE SHOT" SYSTEM (MDI)

| Composition | Foam 1 | Foam 2 | Foam 3 | Foam 4 |
|---|---|---|---|---|
| Polyisocyanate (Mondur MR) | 100.0 at 75° F | 100.0 at 75° F | 100.0 at 75° F | 100.0 at 75° F. |
| Sucrose polyol | 70.5 at 60° F | 69.7 at 60° F | 68.0 at 60° F | 70.0 at 60° F. |
| P. polyol (Example S)[1] | 20.2 at 60° F |  |  |  |
| P. polyol (Example R) |  | 20.2 at 60° F |  |  |
| P. polyol (Example P) |  |  | 20.2 at 60° F |  |
| P. polyol (Example Q) |  |  |  | 20.2 at 60° F. |
| Emulsifier | 1.0 at 60° F | 1.0 at 60° F | 1.0 at 60° F | 1.0 at 60° F. |
| Catalyst[2] | 3.5 at 60° F | 3.5 at 60° F | 3.5 at 60° F | 3.5 at 60° F. |
| Blowing agent[3] | 31.8 at 60° F | 31.7 at 60° F | 31.5 at 60° F | 31.8 at 60° F. |
| Cream time | 25–26 sec | 27–29 sec | 27 sec | 25 sec. |
| Set time | 52–55 sec | 56–60 sec | 55–58 sec | 55–57 sec. |
| Foam appearance | Good | Good | Good | Good. |
| Cell structure | Fine | Fine | Fine | Fine. |
| Density, lbs./cu. ft | 1.99 | 1.99 | 1.99 | 1.94. |
| Initial fire test | 1″, 38 sec. flame out | 1″, 36 sec. flame out | 1³⁄₁₆″, 35 sec. flame out | 1″, 37 sec. flame out. |
| 1 week at 158° F., H.A.[4] | 1″, 34 sec. flame out | {1″, 24 sec.; 1¹⁵⁄₁₆″, 28 sec. SE[5]} | {1″, 22 sec.; 1¼″, 26 sec. SE} | 1⁵⁄₁₆″, 28 sec. flame out. |
| 2 weeks at 158° F., H.A | 1″, 32 sec. flame out | {1″, 26 sec.; 1¼″, 33 sec. SE} | 1″, 28 sec. flame out | 1³⁄₁₆″, 27 sec. flame out. |
| 4 weeks at 158° F., H.A | 1″, 23 sec. flame out | {1″, 18 sec.; 1¼″, 27 sec. SE} | {1″, 19 sec.; 1¹⁄₁₆″, 27 sec. SE} | 1³⁄₁₆″, 26 sec. flame out. |
| Remarks: |  |  |  |  |
| 1 week at 158° F., H.A | ½″ expansion | ⅛″ expansion | ⁵⁄₁₀″ expansion | ⁵⁄₁₀″ expansion. |
| 2 weeks at 158° F., H.A | ³⁄₁₆″ expansion | ⅛″ expansion | ⅛″ expansion | ⅛″ expansion. |
| 4 weeks at 158° F., H.A | ¼″ expansion | ³⁄₁₆″ expansion | ³⁄₁₀″ expansion | ³⁄₁₀″ expansion. |

[1] P. polyol = Hydroxyalkyl phosphate. [2] Catalyst=Triethylenediamine (DABCO), 1 part by weight, dissolved in 4 parts by weight of a sucrose polyether polyol (1 mole of sucrose, 11 moles of propylene oxide and 4 moles of ethylene oxide). [3] Blowing agent=$CCl_3F$. [4] H.A.=Humid aging. [5] SE=Self-extinguishing.

From the data of Table I, it is apparent that in every instance, the foams were of low density. In each instance, the foams were of low density. In each instance, there was only slight expansion of the samples in humid aging. The foams were all of excellent flame resistance, both before and after humid aging for periods of 1, 2 and 4 weeks. In several instances, the flaming foams extinguished themselves more quickly after humid aging than before. This is particularly true of Foam 4, wherein the burning ceased in 37 seconds after burning 1 inch of the samples. After humid aging 1 week, the flame was out in 28 seconds after $^{15}/_{16}$ inch of the sample had burned. After 2 weeks of humid aging, the flame was out in 27 seconds after only $^{13}/_{16}$ inch of the sample was consumed. After 4 weeks of humid aging, the sample extinguished itself in 26 seconds, only $^{13}/_{16}$ inch of the sample being consumed.

These results are remarkable inasmuch as polyurethane resin foams formed of the same ingredients, but without the hydroxyalkyl phosphate, would burn up when once ignited.

The same thing is true of those foams wherein the polyisocyanate component is a diisocyanate or is a prepolymer containing a susbtantial number of urethane linkages as in a prepolymer, and the hydroxyalkyl phosphate is used 13 to 15 seconds. The cream time and set time, respectively, were within a period of 18 to 20 seconds.

The products were allowed to foam and cure exothermally. The initial properties of the foams were in each instance good, the structure being fine and uniform, and the bodies being light weight, strong and non-friable. Samples of the foamed bodies were cut and aged under 100 percent humidity (H.A.) at 158° F. for periods of 1 week, 2 weeks and 4 weeks. Sets of the samples, after humid aging as above described, were then subjected to burning tests in accordance with the provisions of ASTM 1692–59T. The times required for burning lengths of 5 inches were observed. The data for the several samples are tabulated as follows:

TABLE II.—PREPOLYMER SYSTEM

| Composition | Foam 1 | Foam 2 | Foam 3 | Foam 4 |
|---|---|---|---|---|
| Prepolymer | 100.0 at 75° F | 100.0 at 75° F | 100.0 at 75° F | 100.0 at 75° F. |
| Sucrose polyol | 71.0 at 60° F | 71.5 at 60° F | 68.5 at 60° F | 71.5 at 60° F. |
| P. polyol (Example S) | 20.0 at 60° F | | | |
| P. polyol (Example R) | | 20.0 at 60° F | | |
| P. polyol (Example P) | | | 20.0 at 60° F | |
| P. polyol (Example Q) | | | | 20.0 at 60° F. |
| Catalyst | 3.5 at 60° F | 3.5 at 60° F | 3.5 at 60° F | 3.5 at 60° F. |
| Blowing agent | 32.0 at 60° F | 32.0 at 60° F | 32.0 at 60° F | 32.0 at 60° F. |
| Foam appearance | Good | Good | Good | Good. |
| Color | White | White | Off-white | White. |
| Cell structure | Fine, uniform | Fine, uniform | Fine, uniform | Fine, uniform. |
| Density, lbs./cu. ft | 2.15 | 2.00 | 2.03 | 2.03. |
| Initial fire test [1] | 5″, 100 sec | 5″, 97 sec | 5″, 95 sec | 5″, 99 sec. |
| 1 week at 158° F., H.A.[2] | 5″, 72 sec | 5″, 74 sec | 5″, 85 sec | 5″, 71 sec. |
| 2 weeks at 158° F., H.A | 5″, 54 sec | 5″, 59 sec | 5″, 65 sec | 5″, 62 sec. |
| 4 weeks at 158° F., H.A | 5″, 57 sec | 5″, 56 sec | 5″, 54 sec | 5″, 49 sec. |
| Remarks: | | | | |
| 1 week at 158° F., H.A | $1^{1}/_{16}$″, expansion, slight discolor. | $^{1}/_{2}$″ expansion, slight discolor. | $^{3}/_{8}$″ expansion, slight discolor. | $^{9}/_{16}$″ expansion, slight discolor. |
| 2 weeks at 158° F., H.A | $^{3}/_{4}$″ expansion, slight to medium discolor. | 1″ expansion, slight to medium discolor. | $1^{1}/_{16}$″ expansion, slight to medium discolor. | $^{7}/_{8}$″ expansion, slight to medium discolor. |
| 4 weeks at 158° F., H.A | $1^{1}/_{16}$″ expansion, end discolor. | $^{3}/_{4}$″ expansion, medium discolor. | $^{3}/_{4}$″ expansion, considerable discolor. | $1^{3}/_{16}$″ expansion, considerable discolor. |

[1] The samples were 5 inches long and were totally consumed.  [2] H.A.=Humid aging at 100 percent relative humidity.

singly as a flame retardant. When a combination of phosphorylamide and a hydroxyalkyl phosphate is used as a flame retardant in the latter foam, good initial retardancy is obtained, but the foams are not so good in this respect after humid aging.

The advantages of this "one shot" system wherein a hydroxyalkyl phosphate prepared in accordance with this invention was used in a prepolymer foam wherein the polyisocyanato component was free of urethane linkages, as compared with a corresponding prepolymer system, is demonstrated by the following example (Example 2).

EXAMPLE 2

Prepolymer system

This example is similar to Example 1 except that in this instance, the polyisocyanate component was prereacted with a portion of the sucrose polyol to provide a so-called prepolymer, which was then further reacted with added sucrose polyol and other constituents required in preparing a polyurethane foam to provide a foamable mixture. The prepolymer was of a mixture of sucrose polyether polyol comprising 1 mole of sucrose, 11 moles of propylene oxide and 4 moles of ethylene oxide. The prepolymer comprised 20 percent by weight of sucrose polyether polyol based on the mixture comprising the prepolymer and 80 percent by weight of toluene diisocyanate upon a like basis. The phosphorus polyols, designated as "P. polyol" in Table II, were respectively from Examples S, R, P and Q. The blowing agent was $CCl_3F$ (Freon 11).

The mode of operation substantially corresponded to that of Example 1, except that the polyisocyanate was initially reacted with a part of the polyol to provide a quasi-prepolymer, which was used as package (A). The samples were mixed upon a turbo-mixer for a period of It will be observed that there was substantial expansion of the several samples in the humid aging. This, of course, is objectionable under conditions wherein the foam might be exposed to moisture, as for instance, in the insulation of a refrigerator or other cold storage apparatus.

It will be observed that in all instances, the foams burned for at least 5 inches and apparently would burn until completely consumed in the fire test. There was a substantial speeding up of the combustion when the samples were subjected to the longer periods of humid aging, as for instance, 2 weeks and 4 weeks. It was recognized that foams of this type wherein the polyisocyanate component is introduced as a prepolymer of the sucrose polyether polyol and the polyisocyanate, and therefore contained ether linkages, would be objectionable because of loss of flame retardancy when the foams were exposed to the effects of moisture for substantial periods of time.

EXAMPLE 3

Direct oxyalkylation of phosphoric acid

In accordance with the provisions of this example, phosphorus polyols which were the polyols obtained by direct reaction of phosphoric acid or phosphorus pentoxide without preliminary formation of an ester by reaction of an alcohol component with phosphoric acid or phosphorus pentoxide, were used as fire retardant agents. Mixing was by turbo-mixer and curing was without extraneous heat.

It was observed that in this system, the foams were very difficult to cure. Samples were tacky even after a period of 72 hours. The foams were also slow foaming, a time of at least 1000 seconds being required for the foam to attain maximum expansion in each instance. The foams upon humid aging exhibited a tendency to change dimensions and to distort as a result of such changes. The compositions and their behavior as foams are tabulated as follows:

TABLE III.—DIRECT OXYALKYLATION OF PHOSPHORIC ACID

| Composition | Foam 1 | Foam 2 | Foam 3 | Foam 4 |
| --- | --- | --- | --- | --- |
| Polyisocyanate (MDI) | 100.0 at 75° F | 100.0 at 75° F | 100.0 at 75° F | 100.0 at 75° F. |
| Sucrose polyol | 63.0 at 60° F | 63.0 at 60° F | 52.0 at 60° F | 43.0 at 60° F. |
| P. polyol (Example I) | 45.0 at 60° F | 45.0 at 60° F | | |
| P. polyol (Example U) | | | 45.0 at 60° F | |
| P. polyol (Example V) | | | | 45.0 at 60° F. |
| Catalyst | 1.3 ml at 60° F | | 1.3 ml at 60° F | 1.3 ml at 60° F. |
| Surfactant | 1.0 at 60° F | 1.0 at 60° F | 1.0 at 60° F | 1.0 at 60° F. |
| Blowing agent | 32.0 at 60° F | 32.0 at 60° F | 30.0 at 60° F | 29.0 at 60° F. |
| Remarks | Slow foaming, maximum rise 1000 sec. | Slow foaming, maximum rise 2000 sec. | Slow foaming, maximum rise 1000 sec. | Slow foaming, maximum rise 1000 sec. |
| Initial appearance | Fair, ⅔ normal volume | Fair, ⅔ normal volume | Fair, ⅔ normal volume | Fair, ⅔ normal volume. |
| RTC, 72 hours [1] | Foam was tacky | Foam was tacky | Foam was tacky | Foam was tacky. |
| Density, lbs./cu. ft | 2.333 | 2.53 | 2.11 | 2.06. |
| Initial fire test | 1″, 28 sec.<br>1¾″, 51 sec. SE [2] | 1″, 38 sec.<br>1¹¹⁄₁₆″, 65 sec. SE | 1″, 34 sec.<br>1⁵⁄₁₆″, 47 sec. SE | 1″, 31 sec.<br>1¹¹⁄₁₆″, 51 sec. SE. |
| 4 days at 158° F., H.A. [3] | Medium brown, ¹⁄₁₆″ shrinkage. | Reddish brown, ¹⁄₁₆″ shrinkage. | Dark reddish brown, no expansion, no shrinkage. | Medium brown, ³⁄₁₆″ expansion. |
| | 1″, 25 sec.<br>2⁹⁄₁₆″, 63 sec. SE | 1″, 26 sec.<br>2⁵⁄₁₆″, 65 sec. SE | 1″, 29 sec.<br>3⁹⁄₁₆″, 81 sec. SE | 1″, 22 sec.<br>2⁵⁄₁₆″, 57 sec. SE. |
| 2 weeks at 158° F., H.A. | No expansion<br>1″, 25 sec.<br>1¹¹⁄₁₆″, 49 sec. SE | No expansion<br>1″, 28 sec.<br>1⁹⁄₁₆″, 52 sec. SE | ¹⁄₁₆″ expansion<br>1″, 30 sec.<br>1¹¹⁄₁₆″, 28 sec. SE | ¹⁄₁₆″ expansion.<br>1″, 27 sec.<br>1¼″, 37 sec. SE. |
| 4 weeks at 158° F., H.A. | ¹⁄₁₆″ expansion<br>1″, 19 sec.<br>2¾″, 71 sec. SE | No expansion<br>1″, 22 sec.<br>1¾″, 50 sec. SE | No expansion<br>1″, 22 sec.<br>1¼″, 39 sec. SE | ¹⁄₁₆″ expansion.<br>1″, 25 sec.<br>2¼″, 58 sec. SE. |
| 1 week at 158° F., H.A. | Light brown, 2-3% shrinkage, slight distortion. | Reddish brown, 0-1% shrinkage, slight distortion. | Reddish brown, 0-1% shrinkage, slight distortion. | Slight discolor, 2-3% expansion, slight distortion. |
| 2 weeks at 158° F., H.A. | Medium reddish discolor, 2-3% shrinkage, slight distortion. | Dark reddish discolor, 1-2% shrinkage, slight distortion. | Dark reddish discolor, 0-2% shrinkage, slight distortion. | Medium brown discolor, 1-3% expansion, slight distortion. |
| 4 weeks at 158° F., H.A. | Medium to dark discolor, 1-2% shrinkage, slight distortion. | Very dark discolor, 1-2% shrinkage, slight distortion. | Very dark discolor, 1-3% shrinkage, slight distortion. | Medium discolor, 0-2% shrinkage, slight distortion. |

[1] RTC = Room temperature cure for 72 hours. [2] SE = Self-extinguishing. [3] H.A. = Humid aging at 100 percent relative humidity.

While polyhydric alcohols, such as the oxyalkylation products of sucrose as herein disclosed, constitute preferred polyols free of phosphorus for use in forming fire retardant foams of this invention, it will be apparent that polyhydric alcohols which are oxyalkylation products of polyphenols or blends of polyphenols and polyhydric alcohols may also be used. The polyhydric phenols which may be so used will usually contain 3 or more hydroxy-substituted benzene rings per molecule, interlinked by 1 or more alkyl groups. Many of these are disclosed in copending application Ser. No. 187,935 to Marco Wismer et al., filed Apr. 16, 1962, now U.S. Patent 3,265,641. Such polyphenols may be obtained by reacting an aldehyde or a ketone with a phenol. These may be represented by the so-called novolacs, having the formula:

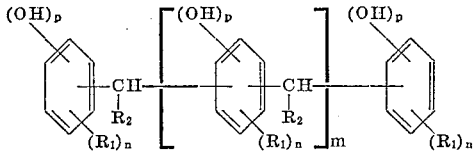

wherein $R_1$ is a group selected from hydrogen and alkyl, $R_2$ is a group selected from the class consisting of hydrogen or alkyl with less than 5 carbon atoms, $p$ is a number from 1 to 3, $n$ is a number from 0 to 3, and $m$ is a number from 0 to 6. Other molecules may be present, but the foregoing structure is typical. The preferred novolac resins have a functionality per molecule of about 2.5 to about 6 or 7, and a hydroxyl number of about 200 to 600. Other polyphenols may be used.

These polyphenols may be oxyalkylated with about 1 to 4 moles per hydroxyl group of an alkylene oxide containing 2 to about 4 carbon atoms per molecule and being represented by ethylene oxide, propylene oxide and n-butylene oxide. Oxyalkylation may be effected with a single alkylene oxide, or two or more alkylene oxides may be blended before the oxyalkylation, or the polyphenol may be oxyalkylated with a portion of one alkylene oxide and then with a portion of a second or even a third. The resultant polyhydric alcohols will then contain hydroxyalkyl groups joined to the benzene rings by ether linkages. Alkylene residues of the alkylene oxides will be interlinked in chains by ether linkages. The oxyalkylation of the polyphenols may be effected in the presence of a catalyst, e.g., trimethanolamine, triethanolamine, sodium hydroxide or potassium hydroxide. The amount may be about 1 percent to 100 percent based upon —OH groups.

If desired, oxyalkylation products of a polyphenol may also be blended with about 1 percent to 99 percent by weight of a sucrose polyether polyol as herein disclosed. Percentages are based upon the combined weights of the two polyols. Likewise, polyphenols or partially oxyalkylated polyether phenols may be blended with a partially alkylated sucrose, e.g., sucrose oxyalkylated with about 3 to 6 moles of ethylene oxides or propylene oxide, but being stripped as far as practicable of water, and the mixture may then be further oxyalkylated with the same alkylene oxide to provide a blend which may contain from 1 up to 6 or 8 residues of alkylene oxide in the side chains per hydroxyl group in the polyols.

The oxyalkylated phenols with or without added non-phosphorus polyol, may be made up with fire retardant phosphorus polyol, blowing agents, catalysts, etc., as heretofore described for the sucrose polyols, to provide a foamable mixture.

Sucrose polyether polyols containing a low ratio, e.g., about 4 to about 6 ethylene or propylene groups per molecule, may be reacted with phosphorus pentoxide or phosphoric acid to provide acid esters which may then be oxyalkylated with ethylene oxide and/or propylene oxide. The resultant esters containing $$\diagdown\!\!P\!\!=\!\!O\diagup$$

groups reacted therein may be blown and reacted with polyisocyanates in accordance with the provisions of this invention to form polyurethane foams.

Although specific examples of the invention have been set forth hereinabove, it is not intended to limit the invention thereto, but to include all of the variations and modifications falling within the scope of the appended claims.

We claim:
1. A polyurethane foam formed by reacting a mixture comprising:
(1) a polyol which is the reaction product of a polyhydroxy compound having a hydroxyl number between about 150 and about 400, containing about 3 to about 8 hydroxyl groups per molecule, and an alkylene oxide containing from 2 to 6 carbon atoms per molecule, said polyol consisting essentially of atoms of carbon, hydrogen and oxygen;
(2) a phosphorus - containing, hydroxyl - substituted compound resulting from reacting an alkylene oxide containing 2 to 6 carbon atoms per molecule with an alkyl acid phosphate having an average active hydrogen functionality of less than 2.0 and greater than 1.0, said phosphorus containing hydroxyl-substituted compound having a hydroxyl value of between about 150 and about 400, said phosphorus-containing polyol being substantially the sole phosphorus-containing fire retardant source in said mixture;
(3) an organic polyisocyanate having an isocyanato functionality of about 2.3 to about 6 per molecule and consisting essentially of hydrocarbon groups and isocyanato groups; in the presence of
(4) a catalyst of urethane formation for polyols and polyisocyanates;
(5) an emulsifier for the mixture; and
(6) a blowing agent.

2. A polyurethane foam as in claim 1, wherein the polyol (1) is a polyol formed by oxyalkylation of sucrose and having the formula:

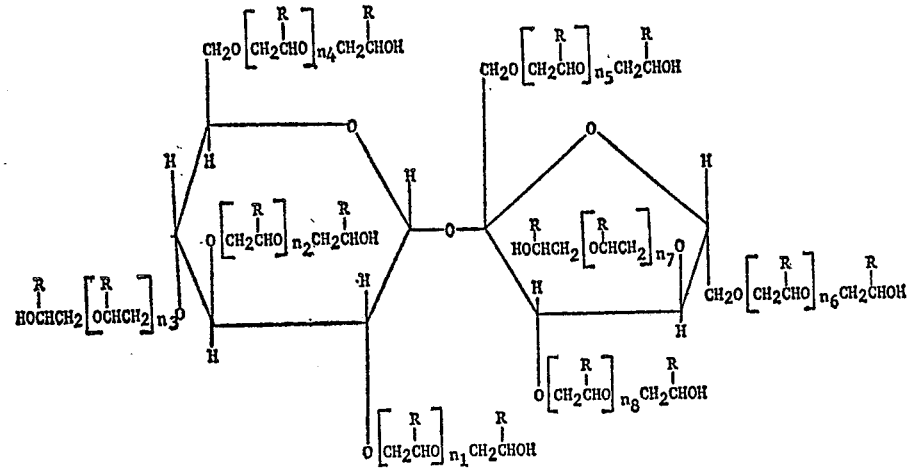

in which R is selected from the class consisting of —H and —$CH_3$ and $n_1$, $n_2$, $n_3$, $n_4$, $n_5$, $n_6$, $n_7$ and $n_8$ are whole numbers from 0 to 8 and their sums being in a range from 2 to 18.

3. A foam as in claim 2, wherein the phosphate ester is a mixture of mono- and dibutyl acid phosphate.

4. A foam as in claim 2, wherein the blowing agent (6) is a volatile chlorofluorocarbon.

5. A foam as in claim 2, wherein the alkyl acid phosphate has an average active hydrogen functionality of less than 2.0 and greater than about 1.5.

References Cited

UNITED STATES PATENTS

| | | | |
|---|---|---|---|
| 3,251,828 | 5/1966 | Lutz | 260—2.5 |
| 3,267,049 | 8/1966 | Hltschmidt et al. | 260—2.5 |
| 3,072,582 | 1/1963 | Frost | 260—2.5 |
| 3,134,742 | 5/1964 | Wismer et al. | 260—2.5 |
| 3,137,662 | 6/1964 | Recktenwald | 260—2.5 |

FOREIGN PATENTS

| | | |
|---|---|---|
| 954,792 | 4/1964 | Great Britain. |
| 598,678 | 1/1961 | Belgium. |

DONALD E. CZAJA, *Primary Examiner.*
F. McKELVEY, *Assistant Examiner.*